INVENTOR
S. E. MILLER
BY Sylvan Sherman
ATTORNEY

Feb. 16, 1971 S. E. MILLER 3,564,433

MULTIPHASE DIFFERENTIAL-PHASE-MODULATED PCM REPEATER

Filed Aug. 26, 1969 3 Sheets-Sheet 2

United States Patent Office 3,564,433
Patented Feb. 16, 1971

3,564,433
MULTIPHASE DIFFERENTIAL-PHASE-MODULATED PCM REPEATER

Stewart E. Miller, 67 Wigwam Road, Locust, N.J. 07760

Original application Aug. 8, 1967, Ser. No. 659,099. Divided and this application Aug. 26, 1969, Ser. No. 870,926
Int. Cl. H04l 27/22
U.S. Cl. 329—112 2 Claims

ABSTRACT OF THE DISCLOSURE

This invention relates to apparatus and method for detecting a $2n$-phase differential-phase-modulated PCM signal in which the relative phase shift between signals in adjacent time slots is $\pm(2m-1)\pi/2n$ radians, where $2n$ is the number of possible signal phases, and $m$ signifies all the integers between one and $n$ inclusive.

Phase detection involves dividing the input signal into $2n$ signal components, and then comparing the phase of each $n$ of these components with the phase of the signal in the next succeeding time slot. This is done by delaying each of said $n$ signal components a specified length of time which depends upon the number of signal phase states. The signals produced as a result of each of these comparisons are amplitude-detected by means of a pair of oppositely-poled amplitude detectors, and then combined in a common impedance to produce $n$ baseband signals which, when taken together, contain all the information necessary to regenerate the input signal. In particular, one of the baseband signals indicates the sign (±) of the phase shift whereas the sum of the other $(n-1)$ baseband signals indicates the magnitude of the phase shift.

The differential-phase-modulated signal is regenerated by coupling the sign-indicating baseband signal to a voltage-sensitive oscillator through a variolosser. The attenuation of the variolosser is controlled by the sum signal of all the other baseband signals.

This application is a division of my copending application Ser. No. 659,099, filed Aug. 8, 1967.

This invention relates to repeaters and receivers for multiphase, differential-phase-modulated PCM signals, also referred to as differentially coherent, phase-shift-keyed (DCPSK) modulation.

BACKGROUND OF THE INVENTION

In the copending application by W. D. Warters, Ser. No. 568,893, filed July 29, 1966, now Pat. No. 3,492,576, and assigned to applicant's assignee, there is described a two-phase, differential-phase-modulated PCM communication system. In this system, a high frequency signal is frequency modulated above and below some reference frequency to produce an equivalent phase modulation of either +90 degrees or −90 degrees. The various advantages of such a system are described by Warters, as are various arrangements for detecting and regenerating the signal.

It is well known that more efficient use can be made of the frequency spectrum by increasing the number of possible signal states from two to more than two. For example, a four-phase, or quaternary system, permits the combination and transmission, along the same transmission path, of two binary-encoded signals. More generally, a $2^p$-phase system would permit the multiplexing of p binary-encoded signals.

SUMMARY OF THE INVENTION

In the copending applications by J. E. Goell, Ser. No. 659,203, filed Aug. 8, 1967, and by W. M. Hubbard, Ser. No. 659,209, filed Aug. 8, 1967, both assigned to applicant's assignee, there are described arrangements for detecting and regenerating a quaternary differential-phase-modulated PCM signal. The present invention relates, more generally, to apparatus and methods for detecting and regenerating a $2n$-phase differential-phase-modulated (DPM) signal in which the relative phase shift between signals in adjacent time slots is $\pm(2m-1)\pi/2$ radians, where $2n$ is the number of possible signal phases, and $m$ signifies all the integers between one and $n$ inclusive. For example, in a two-phase system, $n=1$ and $m=1$. Thus, the differential phase shift between signals in adjacent time slots is either $+\pi/2$ or $-\pi/2$ radians. In a six-phase system, $n=3$, $m=1$, 2 and 3, and the differential phase shift between signals in adjacent time slots is either $\pm\pi/6$, $\pm3\pi/6$ or $\pm5\pi/6$ radians.

Phase detection in a $2n$-phase system involves dividing the input signal into $2n$ signal components, and then comparing the phase of each of $n$ of these components with the phase of the signal in the next succeeding time slot. This is done by delaying each of said $n$ signal components a specified length of time which depends upon the number of signal phase states. The signals produced as a result of each of these comparisons are amplitude-detected by means of a pair of oppositely-poled amplitude detectors, and then combined in a common impedance to produce $n$ baseband signals which, when taken together, contain all the information necessary to regenerate the input signal. In particular, one of the baseband signals indicates the sign (±) of the phase shift, whereas the sum of the other baseband signals indicates the amplitude of the phase shift.

The differential-phase-modulated signal is regenerated by coupling the sign-indicating baseband signal to a voltage-sensitive oscillator through a variolosser. The attenuation of the variolosser is controlled by the sum signal of all the other baseband signals.

These and other objects and advantages, the nature of the present invention, and its various features, will appear more fully upon consideration of the various illustrative embodiments now to be described in detail in connection with the accompanying drawings.

DETAILED DESCRIPTION

Figures 1, 2:
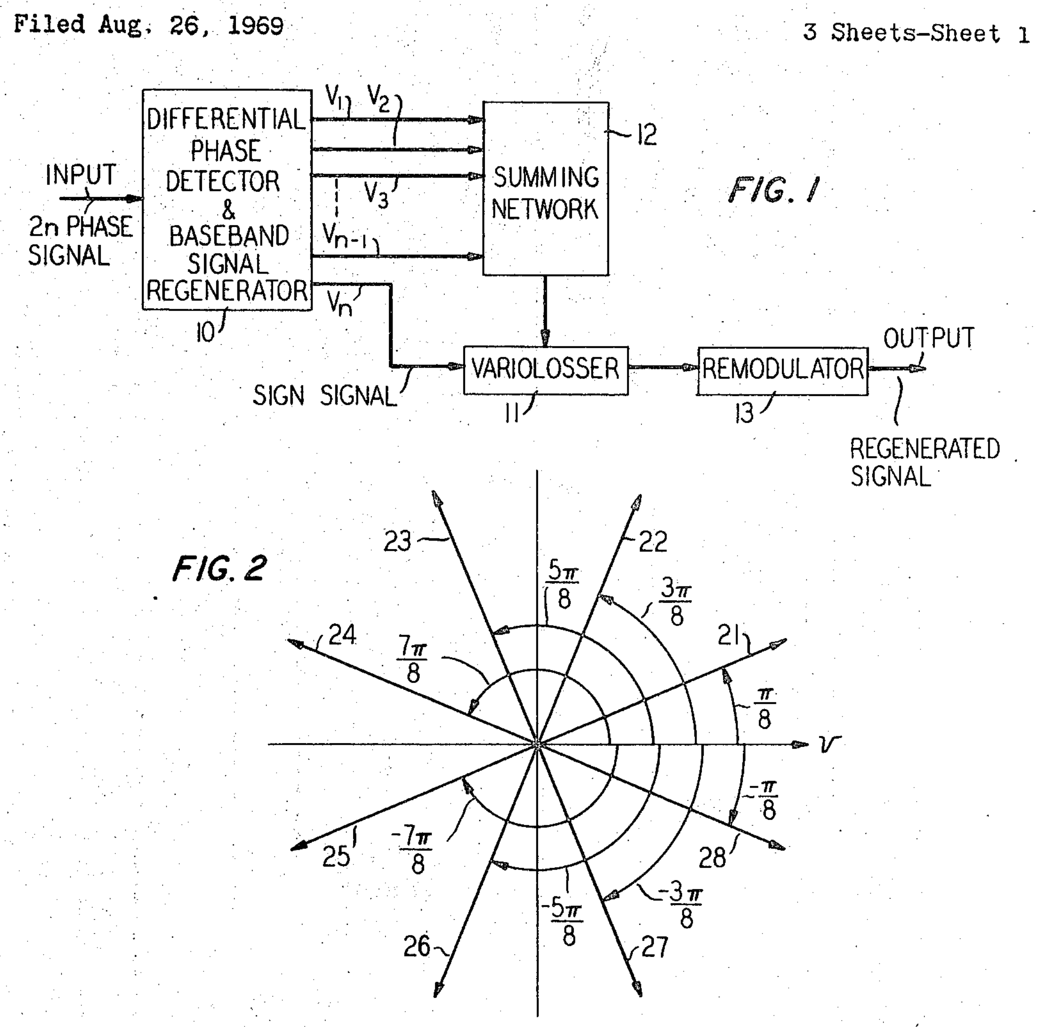
FIG. 1 shows, in block diagram, a portion of a repeater for use in a $2n$-phase differential-phase-modulated PCM system including a differential phase detector and baseband signal regenerator, a summing network, a variolosser and a remodulator.
FIG. 2, included for purposes of explanation, shows the eight possible phase changes the signal can experience between successive sampling intervals.

Referring to the drawings, FIG. 1 shows, in block diagram, a generalized $2n$-phase differential-phase-modulated PCM signal regenerator, as might be used in a PCM repeater. Included in the figure are a differential phase detector and baseband signal regenerator 10, a variolosser 11, a summing network 12, and a remodulator 13.

The $2n$-phase input signal, to which the present invention relates, is a constant amplitude wave whose phase deviates by some discrete amount between sampling interval in adjacent time slots. The generalized expression for this deviation $\Delta\varphi$ is given by $$\Delta\varphi = \pm(2m-1)\frac{\pi}{2n} \quad (1)$$

where:

$2n$ is the number of possible phase states, and $m$ represents all the integers between one and $n$ inclusive.

For purposes of illustration, an eight-phase signal is represented in FIG. 2 by a vector $v$, depicting the signal phase at any sampling instant, and by vectors 21, 22, 23, 24, 25, 26, 27 and 28, depicting the eight possible phase states at the next sampling instant. From Equation 1 $n=4$, and $m=1$, 2, 3 and 4. Thus, the eight differential phase shifts are $\pm\pi/8$, $\pm 3\pi/8$, $\pm 5\pi/8$ and $\pm 7\pi/8$ radians. The function of the arrangement of FIG. 1 is to determine the magnitude and sign of this phase shift and to regenerate the signal. In the discussion that follows, each of the blocks of FIG. 1 is considered in greater detail.

The first of the several components to be considered is the differential phase detector and baseband signal regenerator 10. Basically, the detector is similar to the quaternary differential phase detector described in the copending application by W. M. Hubbard, Ser. No. 659,209, filed Aug. 8, 1967, and assigned to applicant's assignee, but generalized to accommodate higher state differentially-phase-modulated signals.

It is the function of the detector to examine the relative phase of the input signal in two adjacent time slots, and to make two determinations. One determination relates to the magnitude of the phase difference. The other determination relates to the sign of the phase difference.

Figure 3:
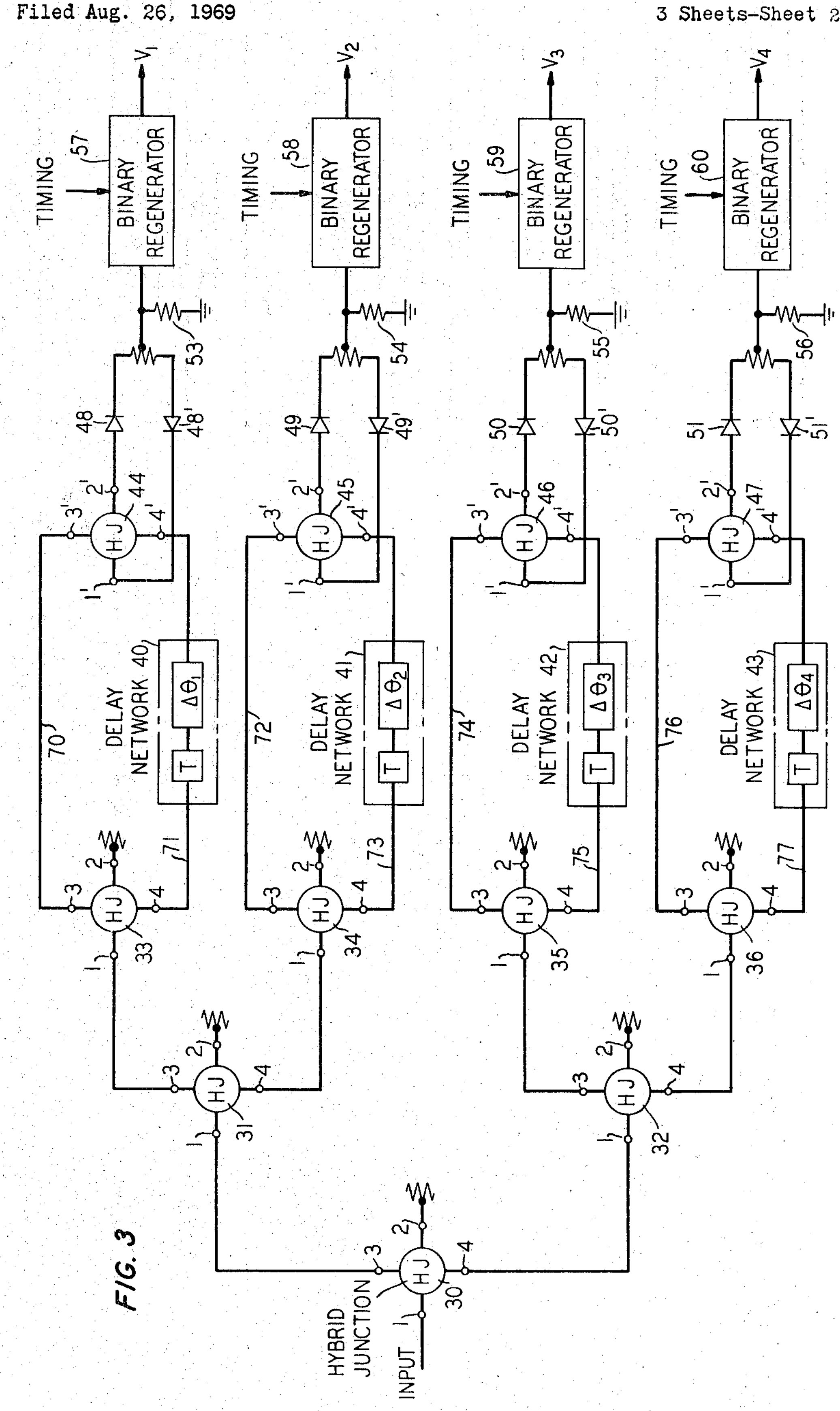
FIG. 3 shows, in greater detail, an eight-phase differential phase detector.

For the purpose of illustrating how this is done, an eight-state phase detector is shown in FIG. 3. The detector includes seven power dividers 30, 31, 32, 33, 34, 35 and 36 for dividing the input signal into $2n=8$ signal components which propagate along wavepaths 70 through 77. Of these eight wavepaths, four wavepaths 71, 73, 75 and 77 include delay networks 40, 41, 42 and 43, respectively, for delaying the signal components propagating therethrough relative to the signal components which propagate through wavepaths 70, 72, 74 and 76. The phase of each one of the delayed signal components is then compared with the phase of the signal in wavepaths 70, 72, 74 and 76 in each of four phase-comparison hybrid junctions 44, 45, 46 and 47. The two output signals derived from each of these comparison hybrids are then amplitude-detected in a pair of oppositely-poled detectors 48–48′, 49–49′, 50–50′ and 51–51′. The resulting pairs of detected signals are then combined in a common output impedance 53, 54, 55 and 56 to form four baseband signals $V_1$, $V_2$, $V_3$ and $V_4$. The latter are, advantageously, regenerated in binary regenerators 57, 58, 59 and 60.

Typically, each of the power dividers 30 through 36 is a 3 db hybrid junction of either the 180 degree or 90 degree variety, having two pairs of conjugate branches 1–2 and 3–4. Branch 1 of each hybrid is the input branch, whereas branch 2 is resistively terminated. Branches 3 and 4 are the output branches from which the divided signal components are extracted.

The pairs of conjugate branches of hybrids 44, 45, 46 and 47 are designated 1′–2′ and 3′–4′. Of these, branches 3′ and 4′ are connected, respectively, to branches 3 and 4 of hybrids 33, 34, 35 and 36 by means of wavepaths 70–71, 72–73, 74–75 and 76–77. One of the waves 71, 73, 75 and 77, of each pair of wavepaths, includes one of the delay networks 40, 41, 42 and 43.

The remaining branches 1′ and 2′ of each of the hybrids 44, 45, 46 and 47 are connected to the oppositely-poled amplitude detectors 48–48′, 49–49′, 50–50′ and 51–51′.

It should be noted that any one of the many well-known types of quadrature or 180 degree hybrid junctions, or mixtures thereof, can be used in the detector. If, however, a mixture of hybrids is used such that the pairs of wavepaths 70–71, 72–73, 74–75 and 76–77 interconnect a quadrature hybrid and a 180 degree hybrid, an additional 90 degree phase shift is added to one or the other of the two wavepaths connecting branches 3–3′ and 4–4′.

As indicated above, it is the function of the differential phase detector to determine the relative phase between signals in adjacent time slots. In the binary differential phase detector, described in the above-identified Warters application, the two signals to be compared arrive at the input branches of the comparison hybrid junction in such a phase that they combine in either one or the other of the hybrid output branches. This results in a detected output signal whose polarity is indicative of the two possible phase states of the signal. In the instant case, however, the situation is more complicated as there are now eight or, more generally, there are $2n$ phase states which must be identified. Since each of the output signals $V_1$, $V_2$, $V_3$ and $V_4$ must provide different bits of information, the phase relationships at the output hybrids 44, 45, 46 and 47 are, of necessity, all different. In particular, each of the delay networks delays the signal component passing through the network a period of time $\tau$, equal to an integral multiple of $\pi$ radians, corresponding approximately to one time slot T. It is found in practice that $\tau$ may differ from T by as much as $\pm 20$ percent, without significantly affecting the performance of the detector. In addition, the phase of the signal is shifted by an additional amount $\Delta\theta_1$ which depends upon the number of phase states the signal may have. In the eight-state phase detector of FIG. 3 the phase shifts $\Delta\theta_1$, $\Delta\theta_2$, $\Delta\theta_3$ and $\Delta\theta_4$ are equal to 0, $\pi/4$, $\pi/2$ and $-\pi/4$ radians, respectively.

With the network adjusted in the manner indicated, the normalized output signals $V_1$, $V_2$, $V_3$ and $V_4$ for each of the eight possible phase states are as given in Table I.

TABLE I

| | $V_1$ | $V_2$ | $V_3$ | $V_4$ | $V_1+V_2+V_4$ |
|---|---|---|---|---|---|
| Differential phase shift: | | | | | |
| $+\pi/8$ | + | + | + | + | +3 |
| $+3\pi/8$ | + | + | + | − | +1 |
| $+5\pi/8$ | − | + | + | − | −1 |
| $+7\pi/8$ | − | − | + | − | −3 |
| $-\pi/8$ | + | + | − | + | +3 |
| $-3\pi/8$ | + | − | − | + | +1 |
| $-5\pi/8$ | − | − | − | + | −1 |
| $-7\pi/8$ | − | − | − | − | −3 |

As can be seen from Table I, the polarity of signal $V_3$, associated with phase delay $$\Delta\theta_3 = \frac{\pi}{2}$$

is indicative of the sign ($\pm$) of the differential phase shift, while the sum of the remaining signals $V_1$, $V_2$ and $V_4$ is indicative of the magnitude of the differential phase shift. Accordingly, these signals contain all of the information required to reconstruct either the original baseband signal, or the high frequency differential-phase-modulated PCM signal. The manner in which this information is used depends upon the nature of the particular circuits used to achieve either of these ends.

Figure 4:
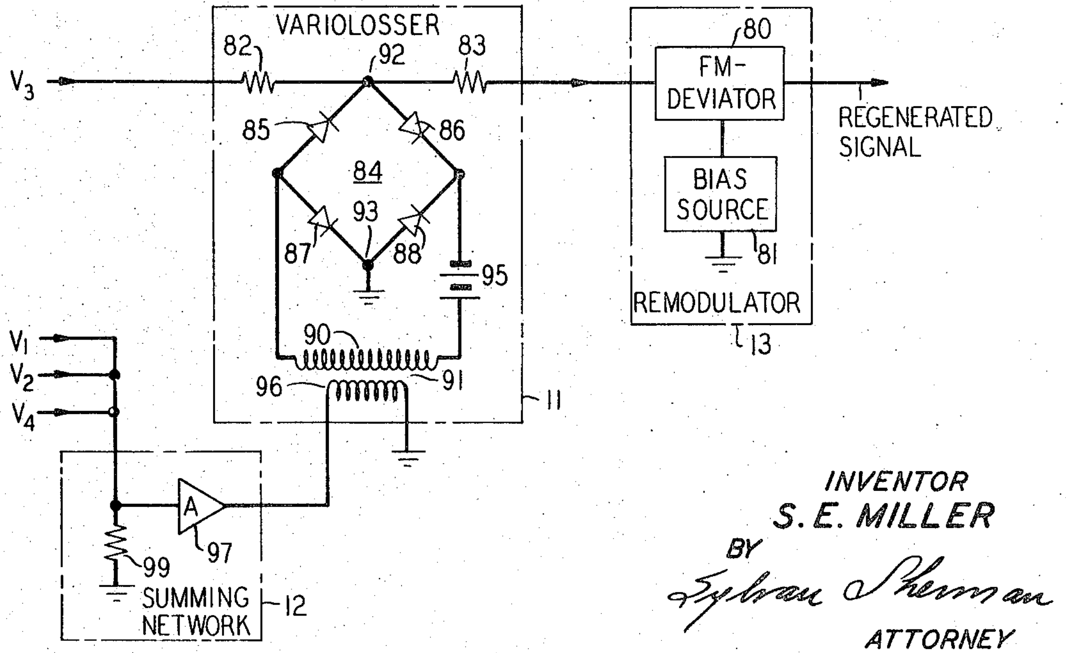
FIG. 4 shows, in greater detail, the summing network, the variolosser and the remodulator.

In accordance with the present invention, signals $V_1$, $V_2$, $V_3$ and $V_4$ are used to reconstruct the high frequency DPM signal by frequency modulating a high frequency oscillator. The latter, identified in FIG. 1 as remodulated 13, is disclosed, more specifically in FIG. 4, as comprising an FM-deviator 80. The latter can be any variety of voltage-controlled oscillator, such as a tunnel diode oscillator, whose frequency of oscillation is a function of the bias applied thereto. The unmodulated oscillating frequency is typically established by a bias source 81. Frequency modulation is produced by means of a signal coupled to deviator 80 in a manner to vary its instantaneous bias.

As is known, a frequency varying signal $f(t)$ undergoes a phase shift $\Delta\varphi$, measured relative to a reference signal at frequency $f_0$, that is given by $$\Delta\varphi=2\pi\int_{t_1}^{t_2}[f(t)-f_0]dt$$

where the integration is over the time interval $t_2-t_1$. In a PCM system, the integration is taken over a period equal to one time slot. In accordance with the present invention, the signal applied to the FM-deviator is of such a magnitude and polarity as to produce a phase shift equivalent to either $\pm\pi/8$, $\pm3\pi/8$, $\pm5\pi/8$ or $\pm7\pi/8$ radians. This is accomplished by variolosser 11 which controls the amplitude of the signal applied to FM-deviator 80.

The variolosser 11 is basically a variable attenuator in the form of a resistive T-network comprising two series resistors 82 and 83, and a shunt arm 84 made up of four diodes 85, 86, 87 and 88. The diodes are connected in a bridge configuration across the secondary winding 90 of transformer 91. The junction 92 between diodes 85 and 86 is connected between series-connected resistors 82 and 83. The opposite junction 93 between diodes 87 and 88 is connected to the opposite side of the $V_3$ signal circuit, designated ground in FIG. 4. Thus, there is a shunt path across the $V_3$ signal circuit whose impedance varies as a function of the bias across the diodes. The latter is established by the D.C. bias source 95, connected in series with winding 90, and the instantaneous voltage induced in winding 90 by the signal coupled to the transformer primary winding 96 from summing network 12.

As indicated above, in connection with Table I, the sum of signals $V_1$, $V_2$ and $V_4$ is indicative of the magnitude of the differential phase shift between signals in adjacent time slots. Accordingly, signals $V_1$, $V_2$ and $V_4$ are summed in summing network 12, which comprises a common impedance 99 and an amplifier 97, and the sum signal thus obtained is used to control the transmission through the variolosser.

It will be noted that the transmission through the variolosser is greatest when the diodes are biased at a low conductivity point, and decreases as the forward bias across the diodes is increased. Since maximum phase deviation required the largest drive signal, the D.C. bias across the diodes and the polarity of the sum signal induced in secondary winding 90 are adjusted to produce minimum forward bias across the diodes when $V_1$, $V_2$ and $V_4$ are all negative, as they are when the differential phase shift is either $+7\pi/8$ or $-7\pi/8$ radians. For phase deviations of $\pm5\pi/8$ radians, one of the signals, $V_2$, is positive, thus increasing the forward bias across the diodes and, correspondingly, decreasing the transmission through the variolosser. Similarly, for lesser phase deviations of $\pm3\pi/8$ or $\pm\pi/8$, the forward bias across the diodes progressively increases, and the transmission through the variolosser correspondingly decreases.

In the illustrative embodiments described above, an eight-state signal was considered. However, as indicated earlier, the principles of the invention are more generally applicable to any $2n$-phase differential-phase-modulated system. In the general case, the differential phase shift between signals in adjacent time slots is $\pm(2m-1)\pi/2n$ radians where $2n$ is the number of possible signal states, and $m$ represents all the integers between one and $n$ inclusive.

In the general system, the phase delays, $\Delta\theta_1$, in the detector circuit are given, for $n$ odd, as $$\mp\pi/2n,\ \pm3\pi/2n,\ \pm5\pi/2n$$

where only $n$ different values are required. For example, in a 6-state system, only three ($n$=3) different phase delays are needed. These would include $\pm\pi/6$ and either $+3\pi/6$ or $-3\pi/6$. Either of the latter can be selected with an appropriate poling of the amplitude detector diodes. For $n$ even, the delays are given by $$0,\ \pm2\pi/2n,\ \pm4\pi/2n,\ \pm6\pi/2n$$

where again, only $n$ different phase delays are required. In all cases, however, the detected signal $V_1$ associated with the circuit for which $\Delta\theta_1=\pi/2$ is indicative of the $$\Delta\theta_1=\frac{\pi}{2}$$

sign of the phase shift.

Referring to the phase detector of FIG. 3, it is noted that half of the signal components are delayed a period of time equal approximately to one time slot. To accomplish this in the particular detector circuit disclosed, a separate time delay T is included in each of the delay networks 40, 41, 42 and 43. Such an arrangement, however, is obviously uneconomical in that it requires four or, more generally, $n$ large delay circuits. Accordingly, there is disclosed in FIG. 5, a second embodiment of a phase detector in which only a single, one-slot delay circuit is required. In this embodiment, the one-slot delay 111 is located in one of the output branches 4 of the input hybrid 100. Consequently, the signal components in hybrids 102 and in the following hybrids 105 and 106 are one time slot delayed relative to the signal components in hybrids 101, 103 and 104. Phase comparisons are made in output hybrids 107, 108, 109 and 110 by comparing signal components from hybrids 103 and 104 with signal components from hybrids 105 and 106. For example, one of the signal components coupled to hybrid 108 is derived from hybrid 104, while the other component is derived from hybrid 106. The additional phase delay circuits 112, 113, 114 and 115 are separately included in the individual wave-paths as in the detector of FIG. 3.

Figure 5:
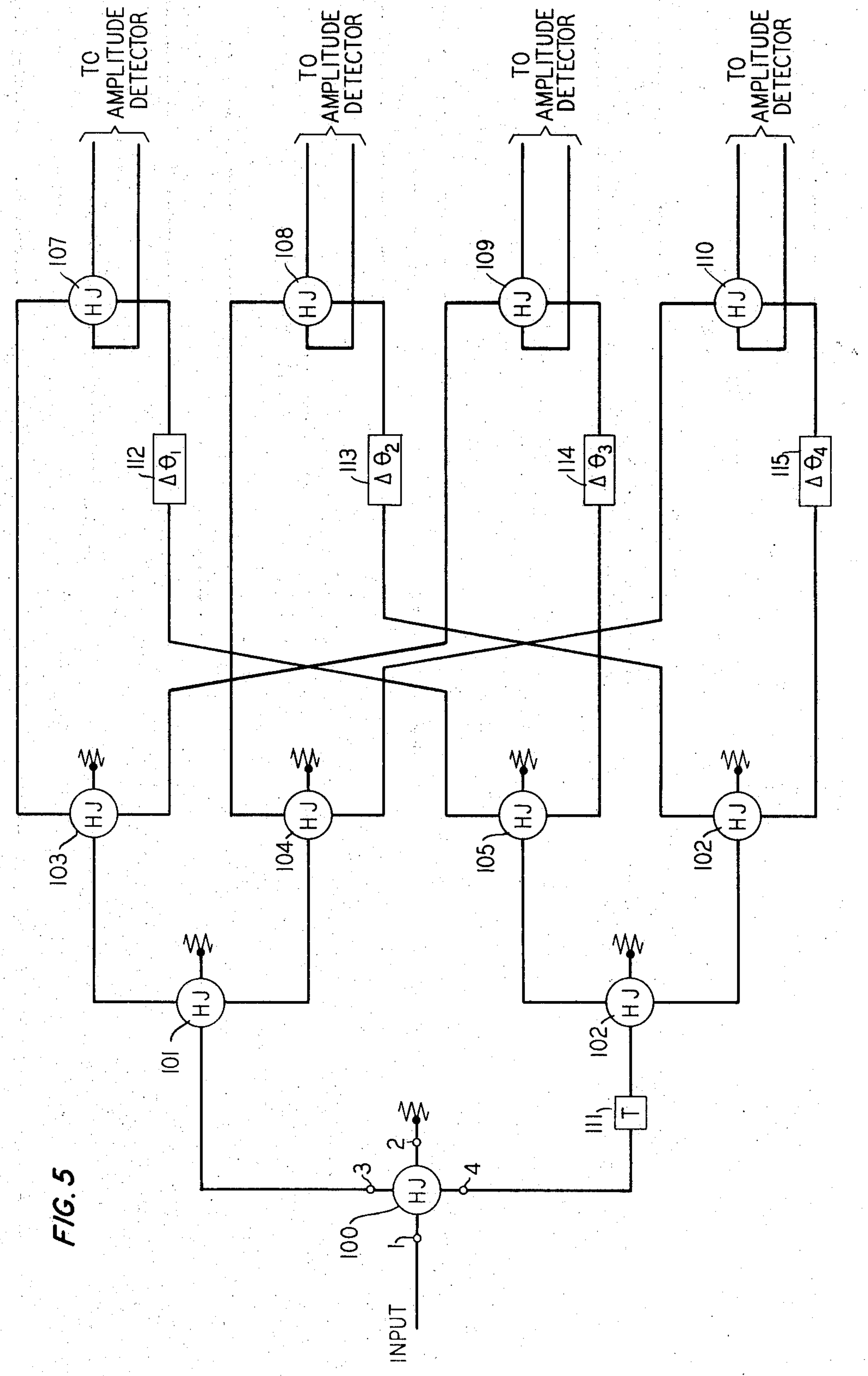
FIG. 5 shows an alternative embodiment of an eight-phase differential phase detector.

The detector arrangement of FIG. 5 has the advantage of requiring only one large delay circuit. In addition, since the resulting delay is common to all the delayed signal components, uniformity of delay is assured.

It will be appreciated that the indicated polarities of signals $V_1$, $V_2$ . . . $V_n$ are merely illustrative. By the simple expedient of reversing diode connections, or by the inclusion of amplifiers, other combinations of signal polarities can be devised to produce the required regenerated output signal. It should also be noted that the specific summing network, variolosser and remodulator circuits shown are merely intended to be illustrative, since other circuits can just as readily be used for these purposes. In addition, it is understood that amplifiers, which have not been shown, would typically be included to control the amplitude of the various signals. Thus, in all cases it is understood that the above-described arrangement is illustrative of but one of the many possible specific embodiments which can represent applications of the principles of the invention. Numerous and varied other arrangements can readily be devised in accordance with these principles by those skilled in the art without departing from the spirit and scope of the invention.

What is claimed is:

1. A differential phase detector for use in a communication system adapted for transmitting a $2n$-phase differential-phase-modulated signal having a phase shift of $\pm(2m-1)\pi/2n$ radians between successive time slots, where $n$ is an integer greater than 2, and $m$ represents all the integers between one and $n$ inclusive, said detector comprising:

means for dividing said signal into $2n$ signal components;

means for delaying $n$ of said signal components relative to the other $n$ signal components a period of time equal to approximately one time slot;

further means for shifting the phase of each of said $n$ delayed components an amount $\Delta\theta_1$ given by $$\pm\pi/2n;\ \pm3\pi/2n;\ \pm5\pi/2n$$

for $n$ odd, and by $$0, \pm 2\pi/2n; \pm 4\pi/2n; \pm 6\pi/2n$$

for $n$ even, where only $n$ different phase values are required;

a plurality of $n$ hybrid junctions each having two pairs of conjugate branches;

means for coupling each of said delayed signal components to a branch of one pair of conjugate branches of one of said hybrid junctions;

means for coupling each of the other $n$ signal components to the other branch of said one pair of conjugate branches of said hybrids;

means comprising oppositely-poled amplitude detectors for amplitude detecting respectively the signals derived from the other pair of conjugate branches of each of said hybrids; and means for combining the detected signals from each pair of amplitude detectors associated with each of said hybrids to produce $n$ phase-detected signals.

2. The phase detector according to claim 1 wherein one of said detected signals is indicative of the sign (±) of the differential phase shift between signals in adjacent time slots; and wherein the sum of the other detected signals is indicative of the magnitude of said phase shift.

References Cited

UNITED STATES PATENTS 3,492,576 1/1970 Warters .......... 325—320X

ALFRED L. BRODY, Primary Examiner

U.S. Cl. X.R.

178—66; 325—320; 329—145